(12) United States Patent
Higuchi

(10) Patent No.: US 7,418,863 B2
(45) Date of Patent: Sep. 2, 2008

(54) ANGULAR RATE SENSOR

(75) Inventor: Hirofumi Higuchi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/528,606

(22) Filed: Sep. 28, 2006

(65) Prior Publication Data

US 2007/0082531 A1    Apr. 12, 2007

(30) Foreign Application Priority Data

Oct. 12, 2005   (JP)   ............... 2005-297558

(51) Int. Cl.
*G01P 1/02* (2006.01)
(52) U.S. Cl. ....................................... 73/493
(58) Field of Classification Search .................. 73/493, 73/431, 866.5, 504.12, 504.04, 504.15, 504.16, 73/504.14
See application file for complete search history.

(56) References Cited

U.S. PATENT DOCUMENTS

| | | | | |
|---|---|---|---|---|
| 5,233,873 | A | * | 8/1993 | Mozgowiec et al. .......... 73/497 |
| 5,471,885 | A | * | 12/1995 | Wagner ................ 73/862.041 |
| 5,635,647 | A | * | 6/1997 | Heinouchi ................... 73/662 |
| 6,112,594 | A | * | 9/2000 | Brinks et al. ................... 73/493 |
| 6,195,261 | B1 | * | 2/2001 | Babutzka et al. ............ 361/752 |
| 6,880,399 | B1 | | 4/2005 | Okoshi et al. |
| 7,234,352 | B2 | * | 6/2007 | Mitani ..................... 73/504.16 |

FOREIGN PATENT DOCUMENTS

| | | |
|---|---|---|
| JP | A-5-164775 | 6/1993 |
| JP | A-2000-314628 | 11/2000 |
| JP | A-2004-053501 | 2/2004 |

OTHER PUBLICATIONS

Korean Office Action dated Aug. 30, 2007 in corresponding Korean Patent Application No. 10-2006-0098986 (and English translation).
Office Communication issued from Korean Patent Office dated Apr. 1, 2008 for related Korean application No. 10-2006-0098986 (a copy translation enclosed).

* cited by examiner

*Primary Examiner*—Helen C. Kwok
(74) *Attorney, Agent, or Firm*—Posz Law Group, PLC

(57) ABSTRACT

An angular rate sensor includes a base member serving as a base, an angular rate sensing element having a vibrating member, a wiring member having a flexible, electrical insulating tape portion and a electrical wire portion. The wiring member has end portions fixed to the base member and a middle portion positioned between the end portions. The middle portion is separated from the base member and the sensing element is mounted to the middle portion. Thus, due to an elasticity of the wiring member, the sensing element can be isolated from an external vibration.

16 Claims, 2 Drawing Sheets

ANGULAR RATE SENSOR

CROSS REFERENCE TO RELATED APPLICATION

This application is based on and incorporates herein by reference Japanese Patent Application No. 2005-297558 filed on Oct. 12, 2005.

FIELD OF THE INVENTION

The present invention relates to an angular rate sensor.

BACKGROUND OF THE INVENTION

Typically, a vibration-based angular rate sensor includes a sensing element that has a vibrating member and detects an angular rate based on a vibration of the vibrating member. The sensing element is fixed to a base such as a circuit board or a case through a wiring member.

The vibrating member is forced to vibrate normally in a predetermined direction. When the vibrating member is rotated, the vibrating member is subjected to coriolis forces. The coriolis forces cause a secondary vibration in a different direction from that of the original vibration. By sensing the secondary vibration, the angular rate can be detected. The two (i.e., original and secondary) vibrations are generally of high frequency of several thousand hertz (Hz).

The angular rate sensor has a vibration isolator that reduces a structural resonance frequency of the sensing element in order to prevent the structural resonance frequency from being equal to the secondary vibration frequency. For example, the structural resonance frequency is reduced to a value ranging from tens to several hundred Hz.

In a vibration-based angular rate sensor disclosed in U.S. Pat. No. 6,880,399, a metal lead wire shaped like a spring is used as the wiring member. Due to the spring-like shape, the lead wire acts as the vibration insulator. In this case, the lead wire needs to have flexibility enough to reduce the structural resonance frequency. The flexibility may be increased by increasing the length of the lead wire. However, an increase in the length of the lead wire may increase the size of the sensor and reduce mechanical strength of the lead wire. Therefore, the sensor may have large size and low reliability.

SUMMARY OF THE INVENTION

In view of the above-described problem, it is an object of the present invention to provide an angular rate sensor having a wiring member, except a lead wire, acting as a vibration isolator.

An angular rate sensor includes a base member such as a circuit board, an angular rate sensing element having a vibrating member, a wiring member having a flexible, electrical insulating tape portion and an electrical wire portion. The wiring member has end portions fixed to the base member and a middle portion positioned between the end portions. The middle portion is separated from the base member and the sensing element is mounted to the middle portion. Thus, due to an elasticity of the wiring member, the sensing element can be isolated from an external vibration.

Since the wiring member has great flexibility, the wiring member can have a small length, as compared to a lead wire. Breaking of the wiring member can be prevented due to the small length. Therefore, the angular rate sensor can has a small size and high reliability.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1A:
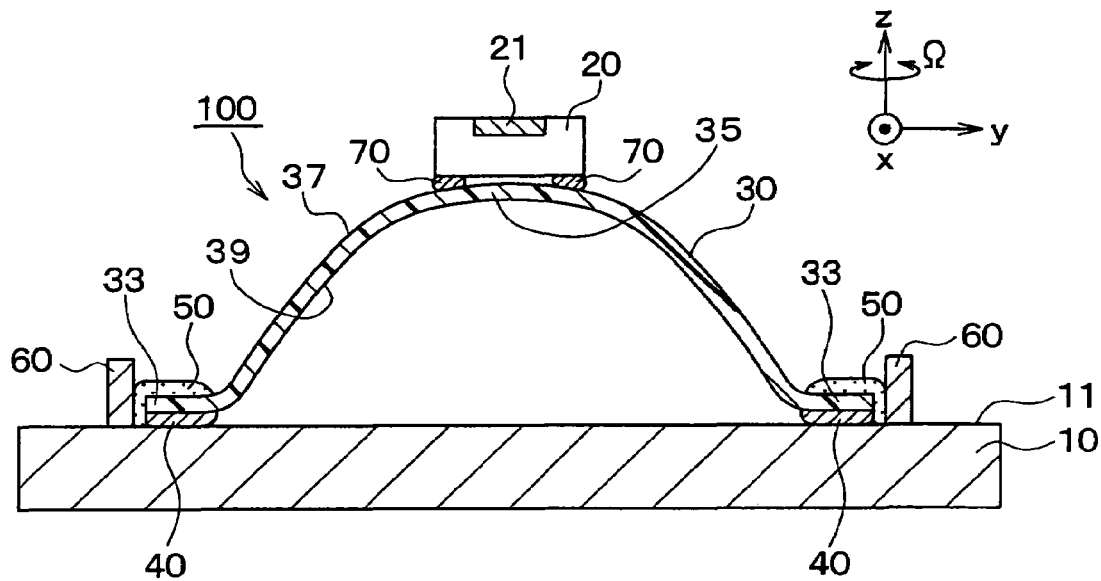
FIG. 1A is a cross-sectional view of an angular rate sensor according to an embodiment of the present invention.
Figure 1B:
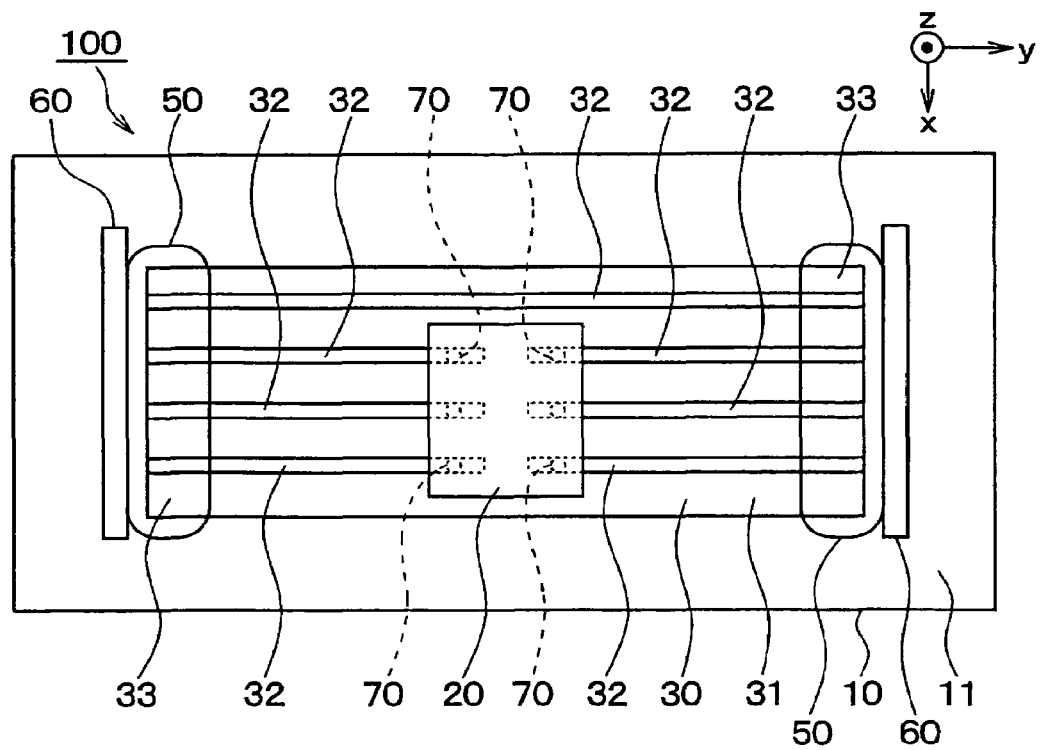
FIG. 1B is a top view of the angular rate sensor of FIG. 1A.

Referring to FIGS. 1A and 1B, an angular rate sensor 100 includes a printed circuit board 10, a sensing element 20 for detecting an angular velocity (rate), and a wiring member 30. The angular rate sensor 100 may be, for example, mounted to a vehicle to measure an angular velocity of the vehicle.

The sensing element 20 is mechanically and electrically connected to the printed circuit board 10 and supported above a surface 11 of the printed circuit board 10 by the wiring member 30.

The printed circuit board 10 acts as a base plate. Alternatively, a ceramics circuit board, a casing, or the like may be used as the base plate.

The sensing element 20 is a semiconductor chip product including a vibrating member 21. The vibrating member 21 has comb-shape electrodes supported by elastic beams. Therefore, the vibrating member 21 can move when the angular velocity is applied to the sensing element 20. Alternatively, various types of sensing elements such as a piezoelectric tuning fork may be used as the sensing element 20.

In FIG. 1A, the vibrating member 21 vibrates normally in a direction of the x-axis. When an angular velocity Ω around the z-axis is applied to the sensing element 20, the vibrating member 21 is subjected to the coriolis forces. The coriolis forces cause a secondary vibration in a direction of the y-axis orthogonal to the x-axis. The secondary vibration is converted to an electrical signal and the angular velocity Ω is detected by sensing the electrical signal.

The wiring member 30 may be, for example, a flexible printed circuit and includes a flexible, electrical insulating tape portion 31 and electrical wire portions 32 disposed on at least one of first and second surfaces 37, 39 of the tape portion 31. For example, the tape portion 31 is made of polyimide resin or polyester resin having electrical insulation properties and the electrical wire portions 32 are made of metal foil such as cupper foil. The tape portion 31 has a thin, rectangle shape like a tape and the electrical wire portions 32 are arranged along the length of the tape portion 31 in a striped pattern. Since the tape portion 31 is made of resin, the wiring member 30 has great flexibility, as compared to a wiring member made of metal.

The wiring member 30 has two end portions 33 along its length. The end portions 33 are fixed to the surface 11 of the printed circuit board 10 through conductive bonding members 40 such as solder or a conductive adhesive. The electrical wire portions 32 of the wiring member 30 are electrically connected to a conductive part (not shown) of the printed circuit board 10 through the bonding members 40. The mechanical connections between the end portions 33 and the printed circuit board 10 are reinforced by reinforcements 50 such as an adhesive or molded resin. Thus, the wiring member 30 is mechanically and electrically connected to the printed circuit board 10. Alternatively, the printed circuit board 10 and the wiring member 30 may be mechanically and electrically connected to each other by welding, clamping, or the like.

As shown in FIG. 1A, stoppers 60 project upwardly from the surface 11 to block the end portions 33. Thus, the stoppers 60 prevent misalignment of the end portions 33, i.e., keep the wiring member 30 in a correct location on the surface 11. The stoppers 60 are unitary with or bonded to the printed circuit board 10. Alternatively, the stoppers 60 may be recessed in the printed circuit board 10. In this case, the end portions 33 are inserted into the stoppers 60. Thus, she stoppers 60 keep the wiring member 30 in the correct location on the surface 11.

The wiring member 30 has a middle portion 35 between the end portions 33. As shown in FIG. 1A, the wiring member 30 curves upward in the middle portion 35 such that the middle portion 35 is separated from the printed circuit board 10. Thus, the wiring member 30 has a similar shape to a dome on the printed circuit board 10.

The sensing element 20 is mounted on the first surface 37 of the middle portion 35. Therefore, the wiring member 30 is positioned between the sensing element 20 and the printed circuit board 10. The sensing element 20 is mechanically and electrically connected to the electrical wire portions 32 of the wiring member 30 through conductive bonding members 70 such as the solder or the conductive adhesive. The sensing element 20 transmits and receives electrical signals to and from an external device through the wiring member 30 and the printed circuit board 10.

Due to elasticity of the tape portion 31, the wiring member 30 can be elastically deformed in the direction of the z-axis of FIG. 1A, i.e., in the direction orthogonal to the surface 11 of the printed circuit board 10. The wiring member 30 also can be elastically deformed in the direction of the y-axis of FIG. 1A, i.e., in the direction of the secondary vibration of the vibrating member 21. Thus, the wiring member 30 can reduce unwanted external vibrations that are applied to the sensing element 20 in the directions of the y-axis and z-axis.

As described above, the wiring member 30 curves upward in the middle portion 35 such that the middle portion 35 is separated from the printed circuit board 10. Thus, the wiring member 30 can be elastically deformed in the direction of z-axis easily. The sensing element 20 is mounted on the middle portion 35. This approach effectively reduces the external vibrations applied to the sensing element 20 in the direction of the z-axis, i.e., in the direction orthogonal to the original and secondary vibration directions of the vibrating member 21.

Since the wiring member 30 has a width in the direction of the x-axis, i.e., the original vibration direction, the wiring member 30 is less deformed in the direction of the x-axis. Thus, loss of the original vibration can be prevented.

In the angular rate sensor 100, a spring constant of the wiring member 30 and mass of the sensing element 20 and the wiring member 30 constitute a spring-mass system with a given structural resonant frequency. The spring constant of the wiring member 30 is set such that the spring-mass system has the structural resonant frequency (e.g. tens to several hundred Hz) lower than each of resonant frequencies (e.g., several thousand Hz) of the original and secondary vibrations of the vibrating member 21.

As described above, the wiring member 30 includes the tape portion 31 having the flexibility and electrical insulation properties. The end portions 33 of the wiring member 30 are fixed to the printed circuit board 10 and the middle portion 35 between the end portions 33 are separated from the printed circuit board 10. The sensing element 20 is mounted on the middle portion 35. Due to the elasticity of the wiring member 30, the sensing element 20 can be isolated from the unwanted external vibrations.

Since the tape portion 31 is made of resin, the wiring member 30 can have great flexibility, as compared to a lead wire made of metal. Therefore, the wiring member 30 can have a small spring constant so that the wiring member 30 can have a small length, as compared to the lead wire.

Since the wiring member 30 has the small length, the angular rate sensor 100 can be reduced in size. Further, breaking of the wiring member 30 can be prevented due to the small length. Thus, the angular rate sensor 100 can has a small size and high reliability.

The reinforcements 50 and the stoppers 60 are optional. By using the reinforcements 50 and the stoppers 60, the wiring member 30 can be securely fixed to the printed circuit board 10 and act as the vibration insulator more effectively.

In the angular rate sensor 100, the spring constant of the wiring member 30 and the mass of the sensing element 20 and the wiring member 30 constitute a spring-mass system having a structural resonant frequency that depends on a distance between the end portions 33. Therefore, the structural resonant frequency can be adjusted by adjusting the distance between the end portions 33.

For example, as the distance is reduced, the wiring member 30 is curved in the middle portion 35 more sharply and the wiring member 30 can be elastically deformed in the direction of the z-axis more easily. In other words, reducing the distance between the end portions 33 reduces the structural resonant frequency of the spring-mass system. Thus, a desired structural resonant frequency can be obtained by adjusting the distance between the end portions 33.

(Modifications)

Figure 2:
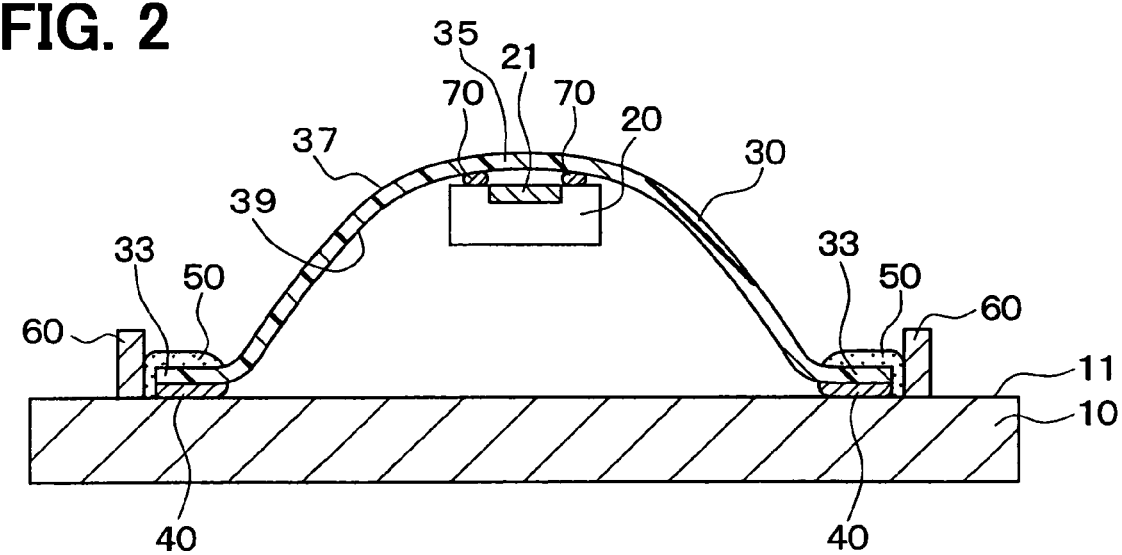
FIG. 2 is a cross-sectional view of an angular rate sensor according to a modification of the embodiment.

Modifications of the embodiment will be described below with reference to FIGS. 2-4.

As described above, the electrical wire portions 32 can be disposed on each of the first and the surfaces 37, 39 of the wiring member 30. As shown in FIG. 2, in a modification of the embodiment, the sensing element 20 is mounted on the second surface 39 instead of the first surface 37. The first surface 37 and the second surface 39 may be electrically connected to each other by, for example, a through hole.

Figure 3:
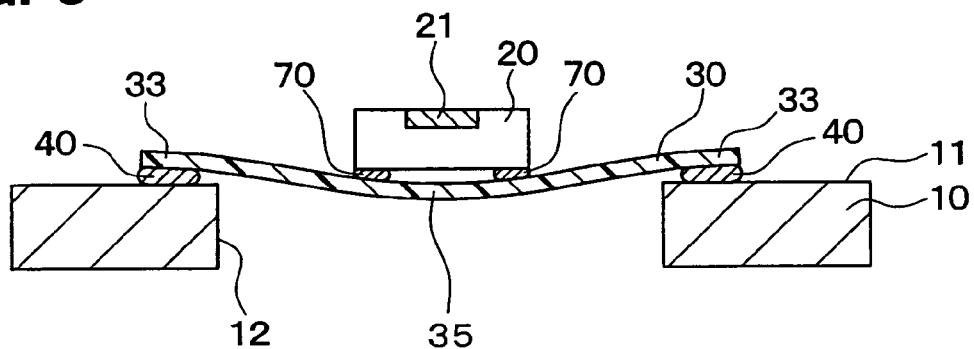
FIG. 3 is a cross-sectional view of an angular rate sensor according to another modification of the embodiment.

As shown in FIG. 3, in another modification of the embodiment, the angular rate sensor 100 includes a printed circuit board 10 having a hole portion 12 as shown in FIG. 3. In this case, the wiring member 30 is placed over the hole portion 12 and fixed to the printed circuit board 10 at the end portions 33. The middle portion 35 is positioned above the hole portion 12 and the sensing element 20 is mounted on the middle portion 35. Thus, due to the elasticity of the wiring member 30, the sensing element 20 can be isolated from the unwanted external vibration.

In another modification of the embodiment, the angular rate sensor 100 include two printed circuit boards 10 that are spaced from each other to form a gap therebetween. In this case, one end portion 33 of the wiring member 30 is fixed to one printed circuit board 10 and the other end portion 33 is fixed to the other printed circuit board 10. Thus, the wiring member 30 is placed across the two printed circuit boards 10 such that the middle portion 35 is positioned above the gap between the two printed circuit boards 10. The sensing element 20 is mounted on the middle portion 35. Thus, due to the elasticity of the wiring member 30, the sensing element 20 can be isolated from the unwanted external vibration. The structural resonant frequency can be adjusted by adjusting a distance between the two printed circuit boards 10.

Figure 4:
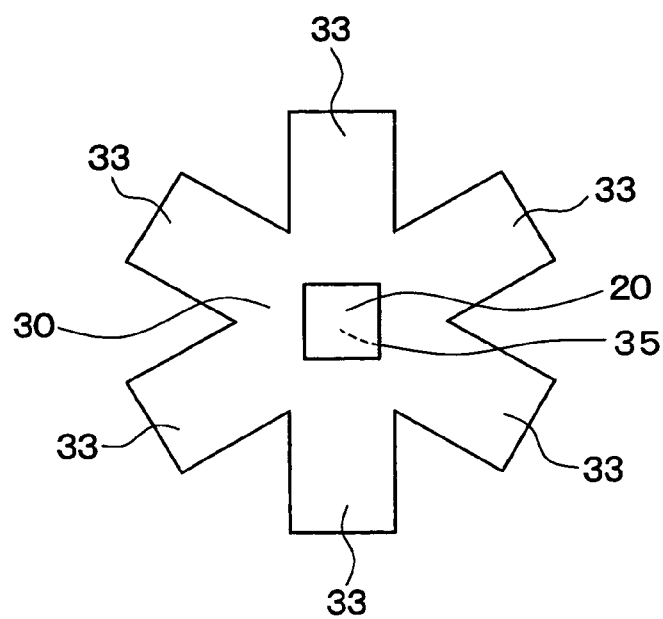
FIG. 4 is a top view of a wiring member of an angular rate sensor according to another modification of the embodiment.

As shown in FIG. 4, in another modification of the embodiment, the angular rate sensor 100 includes a radial wiring member 30 having three or more end portions 33 fixed to the printed circuit board 10. The wiring member 30 is curved upward in the middle portion 35 such that the middle portion 35 is separated from the printed circuit board 10.

The embodiment and modifications described above may be changed in various ways. For example, the tape portion 31 can be made of various materials having flexibility and electrical insulating properties. The wiring member 30 can be fixed to the printed circuit board 10 in various manners, as long as the wiring member 30 is prevented from affecting the original and secondary vibrations of the vibrating member 21. The sensing element 20 and the electrical wire portions 32 of the wiring member 30 may be connected to each other by bonding wires instead of the bonding members 70. The sensing element 20 may be a combined unit such that the semiconductor chip or the piezoelectric tuning fork as a single unit is combined with a circuit board. The sensing element 20 may be a packaged combined unit.

Such changes and modifications are to be understood as being within the scope of the present invention as defined by the appended claims.

What is claimed is:

1. An angular rate sensor comprising:
   a base member serving as a base for the angular rate sensor;
   a sensing element for detecting an angular rate, the sensing element having a vibrating member that normally vibrates in a first direction; and
   a wiring member for electrically connecting the base member and the sensing element, the wiring member including a flexible, electrical insulating tape portion and an electrical wire portion, wherein
   the wiring member has at least two end portions each of which is fixed in a predetermined location on a surface of the base member and a middle portion that is positioned between the end portions and separated from the base member,
   the sensing element is mounted to the middle portion and electrically connected to the electrical wire portion of the wiring member, and
   the wiring member has a dome-like shape so that the middle portion is positioned at a higher level than the end portions with respect to the surface of the base member.

2. The angular rate sensor according to claim 1, wherein the wiring member is curved upward in the middle portion to define free space between the middle portion and the base member.

3. The angular rate sensor according to claim 1, further comprising: a reinforcement member provided around the end portions of the wiring member to increase connection strength between the end portions and the base member.

4. The angular rate sensor according to claim 1, wherein the base member includes a stopper portion to keep the end portions of the wiring member in the predetermined location.

5. The angular rate sensor according to claim 1, wherein
   the base member includes a hole portion, and
   the wiring member is placed over the hole portion such that the middle portion is positioned above the hole portion.

6. The angular rate sensor according to claim 1, wherein
   the wiring member is a flexible printed circuit board,
   the tape portion is made of resin, and
   the electrical wire portion is made of metal foil.

7. The angular rate sensor according to claim 1, wherein
   the wiring member is thin, rectangular, and has the dome-like shape,
   the end portions are positioned along length of the wiring member, and
   the vibrating member normally vibrates in the first direction parallel to a width direction of the wiring member.

8. The angular rate sensor according to claim 1, wherein a spring constant of the wiring member and mass of the sensing element and the wiring member constitute a spring-mass system having a structural resonant frequency that depends on a distance between the end portions.

9. The angular rate sensor according to claim 1, wherein
   the base member is one of two base members spaced from each other to define a gap therebetween, and
   the wiring member is placed over the two base members such that the middle portion is positioned above the gap.

10. The angular rate sensor according to claim 9, wherein a spring constant of the wiring member and mass of the sensing element and the wiring member constitute a spring-mass system having a structural resonant frequency that depends on a distance between the two base members.

11. The angular rate sensor according to claim 1, wherein
    the vibrating member vibrates in a second direction by Coriolis force when the angular rate is applied thereto, and
    the wiring member is deformable in the second direction.

12. An angular rate sensor comprising:
    a base member serving as a base for the angular rate sensor;
    a sensing element for detecting an angular rate, the sensing element having a vibrating member that normally vibrates in a first direction; and
    a wiring member for electrically connecting the base member and the sensing element, the wiring member including a flexible, electrically insulating tape portion and an electrical wire portion, wherein
    the wiring member has at least two end portions each of which is fixed in a predetermined location on the base member and a middle portion that is positioned between the end portions and separated from the base member,
    the sensing element is mounted to the middle portion and electrically connected to the electrical wire portion of the wiring member,
    the vibrating member vibrates in a second direction by Coriolis force when the angular rate is applied thereto, and
    the wiring member is deformable in the second direction.

13. An angular rate sensor comprising:
    a base for the angular rate sensor, which has a substantially flat surface on a side;
    a wiring member disposed on the base, which has at least two end portions and a middle portion, wherein
    the two end portions are separately attached to the base,
    the middle portion is positioned between the end portions,
    the wiring member has a tape portion, which made of elastic and isolating material, and an electrical wire portion, which made of conductive material,
    the electrical wire portion is embedded in the tape portion, and a predetermined part of the electrical wire portion is exposed on a surface of the wiring member at least at the middle portion,
    a sensing element having a vibrating member that vibrates in a first direction parallel to the surface of the base, wherein the sensing element is configured to detect the angular rate of rotation around an axis perpendicular to the surface of the base using the vibration of the vibrating member, wherein the sensing element is located on the surface of the middle portion of the wiring member so that the sensing element is electrically connected to the base through the electrical wire portion, and the wiring member has a dome-like shape such that a top of the dome is spaced from the base, and the sensing element is positioned above the base, and such that the wiring member is more easily deformable in the perpendicular direction than in the first direction.

14. The angular rate sensor according to claim 13, wherein the sensing element is supported due to an elastic force caused by the tape portion which is bent.

15. The angular rate sensor according to claim 13, wherein the wiring member has a thin and rectangular shape, wherein a direction perpendicular to the first direction on the base member is defined as a second direction, the two end portions of the wiring member are arranged along with the second direction, and the dome shaped wiring member is more easily deformable in the, second direction than in the first direction.

16. The angular rate sensor according to claim 15, wherein a spring formed by the wiring member and mass formed by the sensing element and the wiring member constitute a spring-mass system with a given structural resonant frequency, and the structural resonant frequency of die spring-mass system is lower than each resonant frequency of the vibrating member in the first direction and the second direction.

* * * * *